Nov. 27, 1945.　　　O. H. DAWSON　　　2,389,598
PRODUCTION OF TERTIARY PARAFFINS
Filed Feb. 25, 1943
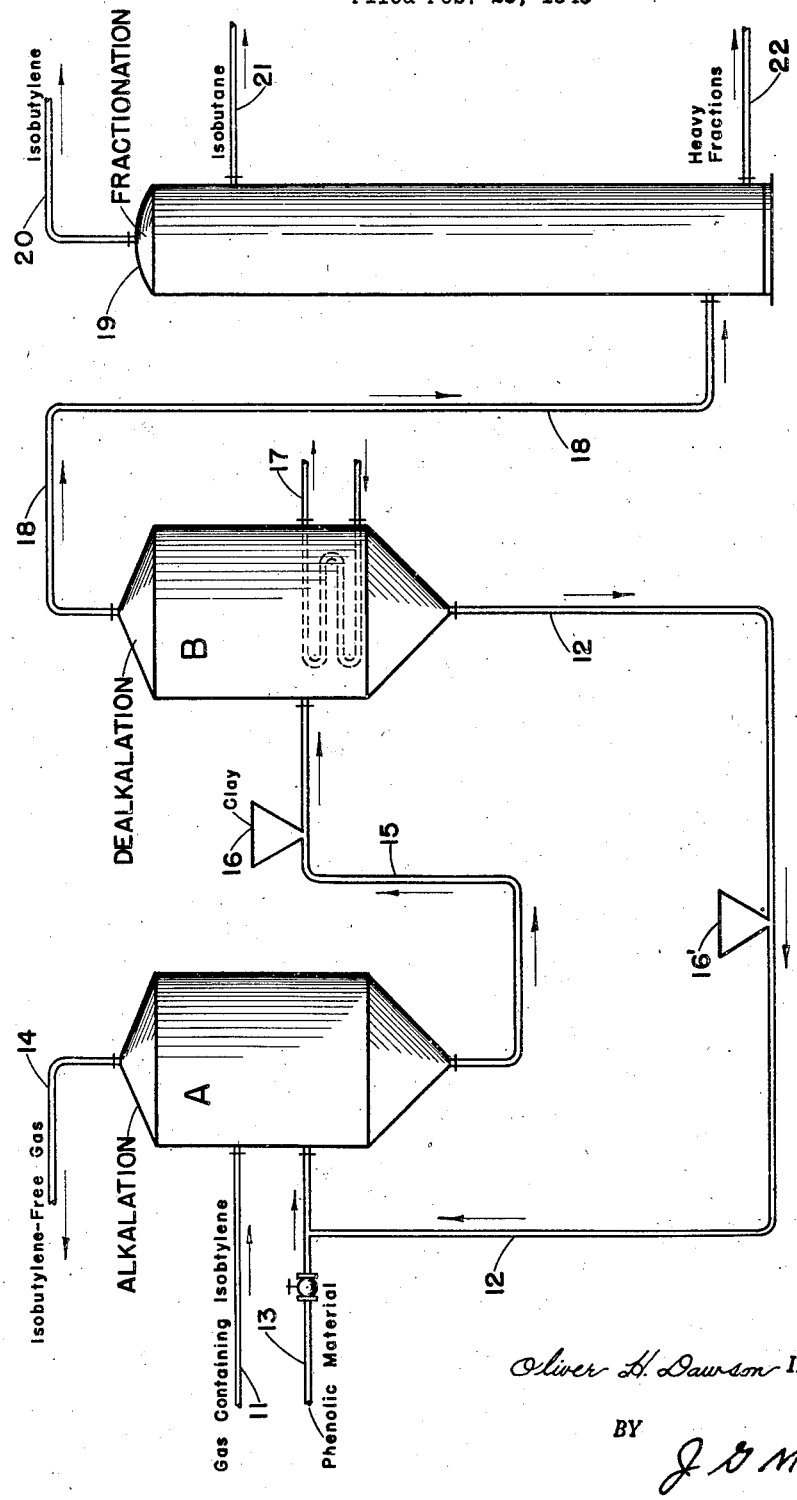
Oliver H. Dawson INVENTOR.
BY
J. D. McKean
ATTORNEY.

Patented Nov. 27, 1945

2,389,598

UNITED STATES PATENT OFFICE 2,389,598

PRODUCTION OF TERTIARY PARAFFINS

Oliver H. Dawson, Baytown, Tex., assignor to Standard Oil Development Company, a corporation of Delaware Application February 25, 1943, Serial No. 477,076

12 Claims. (Cl. 260—676)

The present application is directed to a process for producing tertiary paraffins wherein tertiary olefins are employed as starting materials.

It has been proposed to recover tertiary olefins from mixtures of olefin-containing hydrocarbons by alkylating phenolic materials with the tertiary olefins, separating the alkylated phenols and subsequently decomposing the alkylated phenol to recover tertiary olefins therefrom. An exemplification of such a proposed process is found in the Stevens et al. U. S. Patent 2,265,583.

In accordance with the present invention, paraffins may be obtained from alkylated phenols by heating the phenolic compounds in the presence of a suitable catalyst. It has been found suitable to employ as a catalyst for this purpose an acid clay or a neutral clay which has been acid treated. It has also been found that the use of sulfuric acid in conjunction with the clay, either neutral or acid treated, is beneficial in the treatment of alkylated phenols to produce paraffins.

In practicing the present invention the same catalyst may be employed in the alkylating step as is used in the dealkylating step, the catalyst employed in these two steps of the process either being retained in the system at the points where the steps are performed or if desired the catalyst may be admixed with the liquid reactants and moved through the system with the liquid as it is subjected to the consecutive steps.

The practice of the present invention will now be described in conjunction with the drawing wherein the sole figure is in the form of a diagrammatic flow sheet illustrating a preferred embodiment of the present invention.

Turning now to the drawing it will be seen that two vessels are provided, vessel A in which the alkylation step is practiced and vessel B in which dealkylation takes place. A mixture of hydrocarbon gases and vapors, including isobutylene are injected into the lower portion of vessel A through line 11. Phenolic material is injected into vessel A either by being recycled through line 12 or by the addition of the phenolic material from an extraneous source, not shown, by line 13. A suitable catalytic agent is also present in vessel A. In the embodiment described in the drawing the catalyst is acid clay added to the recycled phenol through hopper 16. Vessel A is maintained in a temperature range of 100–250° F. The phenolic material and catalyst are retained in contact with the isobutylene containing gas for a sufficient interval of time to react with substantially all of the isobutylene. The gas free from isobutylene is removed from vessel A by means of line 14.

The alkylated phenol from vessel A may now be treated to obtain a tertiary paraffin therefrom. In the embodiment disclosed in the drawing it is preferred to maintain a catalytic clay in the two vessels A and B, respectively, and, accordingly, the alkylated phenol is removed from vessel A through line 15 to vessel B. In starting up the process or if for any reason there is not sufficient clay present in vessel B, a suitable supply may be added to the alkylated phenol flowing to the vessel by hopper 16. The alkylated phenolic compound and clay in vessel B is now heated to a temperature by suitable means such as heating coil 17 in the presence of the clay to produce an isobutane fraction. In addition to isobutane removed from vessel B, a portion of the alkylated phenol is decomposed to produce isobutylene and the two materials are vaporized in admixture and flow through line 18 from vessel B to a suitable fractionating column 19 wherein an isobutylene fraction is removed as overhead through line 20, an isobutane fraction is removed as a side stream through line 21 and heavy fractions are taken off as bottoms through line 22.

It will be understood that any suitable method for obtaining alkylated phenolic compounds may be employed. For example, instead of employing clay as a catalyst in vessel A, other catalysts such as sulfuric or sulfonic acid, or sulfuric or sulfonic acid in the presence of clay may be employed.

It is to be emphasized, however, that the presence of clay in vessel B is essential for the production of paraffins from the alkylated phenolic compounds. It is preferable that acidic conditions be maintained in vessel B and to this end it is desirable to use an acid treated clay, a neutral clay in conjunction with acid or an acid treated clay in conjunction with acid. Generally it will be found that the employment of small amounts of sulfuric acid with the clay will give the most satisfactory results. Other acids or acid reacting material besides sulfuric acid may be employed in conjunction with the neutral or acid treated clay. Examples of acids or acid reacting materials are: hydrogen chloride, aluminum chloride, hydrogen fluoride and the like.

In the following table is set out data obtained in three runs in each of which an alkylation and dealkylation step was performed. In run 1 the dealkylation was carried out in the presence of sulfuric acid and, as will be seen from the results, no paraffinic material was obtained. In run 2 the dealkylation step was practiced in the presence of acid clay as a catalyst and substantial amounts of paraffinic material were obtained.

In run 3 a mixture of acid clay and sulfuric acid was present in the dealkylation step and the major portion of the gases evolved was paraffinic with only a small amount of other hydrocarbons produced.

Table I

|  | Run No. | | |
| --- | --- | --- | --- |
|  | 1 | 2 | 3 |
| Alkylation: | | | |
| Alkylating medium | Cresol | Cresol | Cresol. |
| Alkylating gas | Isobutylene | C₄ cut (14.3% isobutylene) | Isobutylene. |
| Temperature, °F | 150 | 150 | 150. |
| Catalyst | Sulfuric acid | Acid clay | Acid clay + sulfuric acid. |
| Dealkylation: | | | |
| Temperature, °F. (max.) | 400 | 400 | 370. |
| Catalyst | Sulfuric acid | Acid clay | Acid clay + sulfuric acid. |
| Gas analysis, percent: | | | |
| Isobutylene | 90.0 | 34.0 | 11.3. |
| Isobutane | | 58.0 | 83.6. |
| n-Butylene | | 2.0 | 0. |
| n-Butane | | 6.0 | 4.8. |

From the above table it will be evident that the presence of clay in the dealkylation step is essential for the production of paraffins. It has been found preferable to use from 1–10% of clay based on the phenolic charge to the dealkylation unit but the amounts may range from less than 1% to as much as 100% and satisfactory results will be obtained. When sulfuric acid is employed in conjunction with the clay, good results are obtained when using 10% by weight of clay and 1% by weight of sulfuric acid based on the phenolic charge but these proportions may be varied upwardly or downwardly. The dealkylation step may be carried out at temperatures ranging from 250–600° F. and at pressures ranging from less than atmospheric to many times atmospheric, but it is preferred to employ a temperature range between 350–400° F. and a pressure of atmospheric.

In the above examples, a batch process was used, but it will be apparent that the invention may be practiced either as a batch process or continuously if desired.

While my invention has been described with respect to producing isobutane from isobutylene, it will be apparent to those versed in the art that other tertiary olefins having a larger number of carbon atoms than isobutylene may be treated to obtain tertiary paraffins in accordance with the present invention. Examples of the tertiary olefins suitable for practice of the present invention are those containing five, six, seven or more carbon atoms in the molecule.

Having fully described the present invention, what I desire to claim is:

1. A method of producing paraffinic hydrocarbons comprising the step of heating an alkyl phenol at a temperature in the range of 250° to 600° F. in the presence of clay under acidic conditions to evolve a paraffinic hydrocarbon therefrom.

2. A method for producing paraffins comprising the step of heating an alkyl phenol at a temperature in the range of 350° to 400° F. in the presence of clay and under acidic conditions to evolve a paraffinic hydrocarbon therefrom.

3. A method in accordance with claim 2 in which the alkyl phenol is heated in the presence of acid treated clay.

4. A method in accordance with claim 2 in which the alkyl phenol is heated in the presence of an admixture of clay and sulfuric acid.

5. A method for forming isobutane comprising the steps of alkylating isobutylene and a phenolic compound to form an alkylated phenol, heating said alkylated phenol in the presence of clay and under acidic conditions at a temperature ranging from 350° to 400° F. to evolve a gas therefrom, condensing said gas and separating isobutane therefrom.

6. A method in accordance with claim 5 in which acid treated clay is in contact with said alkylated phenol as it is being heated.

7. A method in accordance with claim 5 in which a mixture of clay and sulfuric acid is in contact with said alkylated phenol as it is being heated.

8. A method of obtaining isobutane comprising the steps of forming an admixture of isobutylene, a phenolic compound and clay, maintaining said admixture under suitable physical conditions in the presence of an acid reacting material to form an alkyl phenol, and heating said alkyl phenol in the presence of said clay and acid reacting material to evolve a substantial amount of isobutane therefrom.

9. A method in accordance with claim 8 in which said alkyl phenol is heated to a temperature in the range of 350–400° F.

10. A method in accordance with claim 8 in which said alkyl phenol is heated in the presence of clay and sulfuric acid to a temperature in the range of 350–400° F.

11. A method for producing paraffinic hydrocarbons including the step of heating in the presence of clay under acidic conditions and at a temperature in the range of 250° to 600° F., an alkyl phenol formed by alkylating a tertiary olefin and a phenolic compound to evolve a paraffinic hydrocarbon therefrom.

12. A method for producing paraffinic hydrocarbons comprising the step of heating in the presence of clay under acidic conditions and at a temperature in the range of 350° to 400° F. an alkyl phenol formed by alkylating a tertiary olefin and a phenolic compound to evolve a paraffinic hydrocarbon therefrom.

OLIVER H. DAWSON.